2,941,896
METHOD FOR INCREASING THE PIGMENT CONTENT OF PRESSCAKES

Leslie L. Balassa, Scarborough, N.Y., assignor to J. R. Geigy A.-G., Basel, Switzerland No Drawing. Filed July 23, 1958, Ser. No. 750,317

8 Claims. (Cl. 106—309)

The object of this invention is to provide a process for the precipitation of pigments in readily filterable form from their aqueous suspensions.

Another object is to precipitate pigments in a flocculated form which releases the mother liquor readily on filtration or on separation by other means, such as e.g. centrifugation. A further object is to prepare pigments in the form of presscakes with highly increased pigment content as compared to presscakes obtained by following the prior art. An even further object is to precipitate pigments from aqueous suspensions at elevated temperatures in a manner to result in pigment precipitates of exceptionally low water-soluble salt content.

The final stage in the manufacture of pigments is their precipitation from aqueous suspensions which may or may not contain relatively large quantities of water-soluble materials such as salts, acids, alkalis, surface active agents, and others. Many of the organic or inorganic pigments can be filtered only with great difficulty as they tend to form such dense cakes in the filter presses as to block passage of the liquor after a short run. Since it is important for economical operation of a pigment manufacturing process that the filtration should be carried out rapidly, and that the filter presses should be utilized to their maximum capacity, various techniques have been adopted in the past to improve the filtration characteristics of pigment suspensions. Just to name a few of these processes: flocculation through prolonged boiling, treatment with surface active agents or protein matter such as glue, etc. None of these processes has been found to be entirely satisfactory. The difficulties of filtering pigment precipitates have continued plaguing the producers of pigments. The presscakes obtained by following the art are relatively low in pigment content and in addition contain considerable quantities of occluded salts which can be removed only by re-slurrying followed by precipitation. In many cases the pigments obtained are not readily redispersible in water.

It has now been found that it is possible to overcome many of the difficulties encountered in the precipitation of the pigments and to increase the pigment content of the presscake by about 35 to 55%, based on the dry pigment content, by incorporating into the pigment suspension a material, which is soluble in the pigment slurry at low to moderate temperature and is a dispersant for the pigments and which material is insolubilized by and precipitates at elevated temperatures bringing down the pigments with it in the form of a dense sediment. Such a material is a methyl cellulose or a methyl starch which is soluble in water at substantial concentrations below 50° C., but gels at higher temperatures and becomes completely insoluble in water at about 65° C. or higher. The gel point of a methyl cellulose solution is dependent upon the viscosity type of the methyl cellulose, its concentration, and the presence of electrolytes. As the concentration of the methyl cellulose is increased, the gel point is reached at a lower temperature.

Solutions of the higher viscosity types of methyl celluloses or methyl starch gel at lower temperatures than those of the lower viscosity types at the same concentration. A similar relationship exists with regard to the insolubilization of the methyl cellulose.

An explanation of the behavior of methyl cellulose solutions is that methyl cellulose is in the form of aggregates of long thread molecules surrounded by successive layers of water molecules which contribute to the bulk of the aggregate. As the temperature increases, the energy of the loosely bound water molecules increases and those of the outer layers break away resulting in a lowered bulk of the aggregate with a consequent decrease of the viscosity of the solution. When a sufficient number of attached water molecules have been split off the methyl cellulose is no longer soluble and the solution is transformed into a suspension of gel particles. This gelation phenomena is reversible upon cooling. The presence of soluble salts has a marked influence upon the temperature of gelation of the methyl cellulose solutions. Salts in general decrease the temperature of gelation by decreasing the hydration of the methyl cellulose molecules. The degree of salt tolerance of the methyl cellulose solution is a function of the valences of both the positive and negative ions. The higher the valence of either, the lower is the limit of tolerance.

Agents which are suitable for precipitating pigments and which fall under the scope of this invention are cold water soluble methyl cellulose of all types and all grades and cold water soluble methyl starch. Methyl cellulose water-soluble grades have an average methoxylation of 2 methoxy groups per anhydro glucose unit. Water-soluble grades of methyl starch have an average methoxylation of one methoxy group per anhydro glucose unit. Any methyl cellulose or methyl starch which has the minimum number of methoxy group to make them soluble in cold water and insoluble in hot water are suitable in the process of the instant invention. The maximum limit of methoxylation should be set at the point when the cellulose or starch becomes insoluble in cold water while the minimum degree of methoxylation is at the point where the compounds will not become insoluble in hot water.

Pigments which can be precipitated from their aqueous suspensions by the above agents are: inorganic pigments, such as titanium dioxide and iron oxide, and organic pigments such as phthalocyanine blue, phthalocyanine green, azoic pigments, metallized pigments, vat dyestuffs in their insoluble pigment form and many others. As a rule these pigments have to be stable above 70° C. in order to be usable in the process of the instant invention. The following pigments may be mentioned for example together with their Color Index Nos.:

Precipitated iron oxide: C.I. pigment yellow 42 (C.I. 77492),
Phthalocyanine blue: C.I. pigment blue 15 (C.I. 74168), C.I. pigment blue 16 (C.I. 74100),
Phthalocyanine green: C.I. pigment green 7 (C.I. 74260),
Benzidine yellow: C.I. pigment yellow 12 (C.I. 21090), C.I. pigment yellow 13 (C.I. 21100), C.I. pigment yellow 14 (C.I. 21095),
Benzidine orange: C.I. pigment orange 13 (C.I. 21110),
Monoazo pigments: C.I. pigment red 27 and C.I. pigment red 28,
Disazo pigment: C.I. pigment red 38 (C.I. 21120),
Metal lake of acid dye: C.I. pigment red 74.

The following paragraph illustrates the general procedure of the instant invention:

The pigment precipitate after the final step of its preparation is filter-pressed and then re-slurried or as an alternate procedure the pigment is allowed to settle, the supernatant liquid is decanted, fresh water is added to dilute the salts present, and if the salt content is not so high as to coagulate a methyl cellulose or a methyl starch solution, about 1% methyl cellulose or methyl starch is added in form of a 9% aqueous methyl cellulose or aqueous methyl starch solution, calculated on the dry pigment content of the suspension. The pigment suspension containing the methyl cellulose or methyl starch is then heated to above 70° C. preferably to between 90° C. and the boil, while mixing. As the temperature reaches about 65° C., a distinct flocculation of the pigment is noticed. After holding the temperature of the pigment liquor at above 90° C. for about 10 minutes, the hot pigment liquor is filtered through a filter press which has been preheated preferably with boiling water or steam to above 70° C. The presscake is washed with hot water (80° C. to boiling). The pigment presscake obtained in the above manner is usually 35 to 55% higher in dry pigment content than that obtained by filter pressing only, or about 25-40% higher than the pigment content of the presscake obtained by an identical treatment, but without the addition of methyl cellulose or methyl starch to precipitate the pigment. The pigment content usually increases by about 8-12% in control batches without the addition of the precipitating agents. Pigments obtained in the manner according to the present invention are also more brilliant in films deposited from aqueous dispersions. They disperse in aqueous media more readily and when used in water paints or textile printing compositions, they give greater color strength than the same pigment filter pressed in the conventional manner.

An alternate procedure is to filter-press the pigment precipitate from its mother liquor instead of decanting the mother liquor from the precipitate. The presscake so obtained is then re-slurried, the methyl cellulose solution is introduced, then the temperature of the slurry is raised to above 70° C. or preferably to the boil and it is then continued as above.

The most important advantages of the invention are:

(1) It makes possible the preparation of pigment presscakes with substantially higher pigment content than may be obtained by filter-pressing in a conventional manner without the use of methyl cellulose or methyl starch.

(2) The presscakes obtained by the use of this invention make possible the formulation of pigment dispersions of exceptionally high pigment content.

(3) The increased pigment content is obtained at a cost substantially lower than by the use of processes known in the art such as evaporation of the excess water in vacuum.

(4) The presscakes obtained by the use of this invention are particularly suitable for the preparation of aqueous dispersions such as employed in coloring oil-in-water type emulsion textile colors, emulsion paints, latex base paints, latex compositions, etc.

(5) The presscakes obtained by this invention are more readily dispersible with less mechanical shear than is the case with presscakes which were filter-pressed under the same pressure, but in the absence of methyl cellulose.

(6) The aging properties of the presscakes containing methyl cellulose are better than the control presscakes with regard to redispersibility in water after prolonged storage. The following examples serve to illustrate the subject matter of the invention without limiting it in any way. Where not otherwise stated, parts are given as parts by weight and the temperatures are in degrees centigrade. Percentages are, throughout, by weight.

EXAMPLE 1

292 parts of a red toner presscake, containing 29% of a water insoluble azo pigment prepared by coupling 5'-chloro-3-hydroxy-2',4'-dimethoxy-2-naphthanilide with 4-diethylaminosulfo-2-aminoanisole, and thus having 84.68 parts of dry pigment content, is pasted in 1830 parts of water at 49° in a large heavy duty mixing tank. Then 10 parts of a 9% low viscosity methyl cellulose (15 cps.) are added and the batch is mixed. The mixing is continued for 10 minutes. The temperature of the batch is then increased to 95° while mixing. The slurry which appears very flocculated is then filter-pressed through a filter-press preheated with boiling water. The total yield of the presscake is 217 parts with a solids content of 39.4%. This solids content is about 36% higher than the pigment content of the original presscake and 27% higher than could be obtained with the same pigment under identical conditions but without the use of methyl cellulose to precipitate the pigment.

EXAMPLE 2

172 parts of red toner presscake, containing 20% dry pigment, obtained from 3-hydroxy-2-naphtho-o-toluidide coupled with p-nitro-o-toluidine, thus having 34.4 parts of dry pigment content, are pasted in 1000 parts of water of 49° in a large mixing tank. When the presscake is completely slurried in the water, 4 parts of a 9% solution of low viscosity type methyl cellulose (15 cps.) are added. The slurry is mixed for 5 minutes to insure complete dispersion of the methyl cellulose throughout the mass of the slurry. The slurry is then heated to 95° and held for 15 minutes at that temperature while mixing. Then the slurry is filtered through a filter press which is preheated with boiling water. The presscake releases the water readily and at the end of the filtration yields a presscake of 128 parts with a dry pigment content of 28% which is approximately 40% higher than the original pigment content of the presscake and 27.2% higher than could be obtained with the same pigment under identical conditions, but without the use of methyl cellulose to precipitate the pigment.

The pigment obtained is more brilliant and has higher color strength when dispersed in aqueous media than the same pigment precipitated in the conventional manner.

EXAMPLE 3

The same pigment as used in Example 2 is allowed to settle after coupling. About two-thirds of the mother liquor is removed by decanting. Fresh water is introduced until the volume is equal to the original volume. The pigment is then allowed to settle again and two-thirds of the diluted mother liquor is again removed by decanting. Fresh water is added and the procedure is repeated once more. This results in a pigment slurry with an electrolyte content sufficiently low as not to precipitate methyl cellulose solution. The pigment content of the slurry is approximately 1.8%. A 9% solution of a low viscosity methyl cellulose (15 cps.) is added and the slurry is mixed, for five minutes to insure the complete dispersion of the methyl cellulose. The slurry is then heated to 90°, while mixing and it is then filtered through a filter-press preheated with steam. A presscake with a dry pigment content of 27.5% is obtained which is very nearly the same as obtained according to Example 2.

EXAMPLE 4

If in Example 2 the methyl cellulose is replaced by methyl starch and otherwise the same procedure is followed, then a presscake is obtained which has a dry pigment content of 29%. This content is 45% higher than the original content of the presscake and 32% higher than could be obtained with the same pigment under identical conditions, but without the use of methyl starch to precipitate the pigment.

EXAMPLE 5

A phthalocyanine blue presscake ("Monastral" Blue BCF Du Pont) with a 26% dry pigment content is used in this example. The presscake is re-slurried in sufficient water to result in a slurry containing 2% dry pigment. A 3% solution of a high viscosity methyl cellulose (4000 cps.) is added in sufficient quantity to approximate 1% of dry methyl cellulose based on the dry pigment content of the slurry. The slurry is then heated to about 90° while mixing. The hot slurry is filtered through a preheated filter press. The presscake so obtained has a dry pigment content of 36.5%. This pigment content is 40.5% higher than the original content of the pigment presscake, or approximately 30% higher than could be obtained with the same pigment under identical conditions, but without the use of methyl cellulose to precipitate the pigment as shown in the following control test:

The same pigment presscake as used above is handled in an identical manner, but without the addition of methyl cellulose. The presscake in the control batch has a dry pigment content of 28% which is substantially lower than is obtained by the use of methyl cellulose.

EXAMPLE 6

A benzidine yellow presscake of 21% dry pigment content (o-toluidide of acetoacetic acid coupled with 3,3'-dichloro-benzidine) is re-slurried in sufficient water to result in a slurry of 2% dry pigment content. A 5% solution of a medium viscosity grade methyl cellulose (100 cps.) is added in sufficient quantity to equal 2% dry methyl cellulose on the basis of the dry pigment content of the slurry. The slurry is then mixed and treated in the same manner as described in Example 2. The presscake obtained contains 32% dry pigment as against 23% in a control batch which is run in an identical manner but without methyl cellulose. This represents an increase of the pigment content of 52.5% over the original pigment content of the presscake. The increase is 39.3% when compared with the control batch.

If in this example, the 5% solution of the medium viscosity grade methyl cellulose is replaced by a 5% solution of methyl starch in sufficient quantity to equal 4% of dry methyl starch on the basis of the dry pigment content of the slurry, then a presscake is obtained with identical dry pigment content.

The pigment presscakes prepared in the manner described in Examples 1 to 6 inclusive are formulated into pigment dispersions as the first step in the preparation of printing pastes suitable for textile printing as shown in the following example:

EXAMPLE 7

(A)

*Table I*

PIGMENT DISPERSION

| Example No. | 1 | 2 | 3 | 4 | 5 | 6 |
|---|---|---|---|---|---|---|
| Pigment content of Presscake, Percent | 39.4 | 28 | 27.5 | 29 | 36.5 | 32 |
|  | PW | PW | PW | PW | PW | PW |
| Pigment Presscake | 50.00 | 57.20 | 58.20 | 55.30 | 43.80 | 46.80 |
| Naphthalene sulfonic acid condensate sodium salt | 1.00 | 1.00 | 1.00 | 1.00 | 1.00 | 1.00 |
| Sodium lauryl sulfate | 4.00 | 4.00 | 4.00 | 4.00 | 4.00 | 4.00 |
| Casein | 2.00 | 2.00 | 2.00 | 2.00 | 2.00 | 2.00 |
| Methyl Cellulose (15 cps.) | 1.61 | 1.61 | 1.61 | 1.61 | 1.61 | 1.61 |
| Water | 41.39 | 34.19 | 33.19 | 36.09 | 47.59 | 44.59 |
| Total | 100.00 | 100.00 | 100.00 | 100.00 | 100.00 | 100.00 |

PW = Parts by weight.

The pigment dispersion is prepared by mixing first the presscake with a 25% solution of the sodium salt of the naphthalene sulfonic acid condensate and with the dry sodium lauryl sulfate. These surfactants liquefy the presscake. Aqueous solutions of methyl cellulose and casein are then prepared and added to the liquefied presscake. All these additions are made by mixing continuously first with an open turbine mixer and finally with a high speed enclosed turbine mixer. The mixing is continued until a pigment dispersion is obtained which on a North fineness-of-grind gauge gives a fineness reading "off scale."

(B)

The control dispersion for (A) is based on the control pigment presscakes of Examples 1 to 6 inclusive, filter-pressed without methyl cellulose or methyl starch. These presscakes have dry pigment contents which are lower than the presscakes obtained according to this invention and, therefore, correspondingly larger amounts have to be used in order to equal the pigment content of the presscakes above. The formulation of these presscakes is as follows:

*Table II*

| Example No. | 1 | 2 | 3 | 4 | 5 | 6 |
|---|---|---|---|---|---|---|
| Pigment Content of Presscake, Percent | 31 | 22 | 22 | 22 | 28 | 23 |
|  | PW | PW | PW | PW | PW | PW |
| Pigment Presscake | 62.70 | 72.70 | 72.70 | 73.00 | 57.40 | 65.30 |
| Naphthalene sulfonic acid condensate sodium salt | 1.00 | 1.00 | 1.00 | 1.00 | 1.00 | 1.00 |
| Sodium lauryl sulfate | 4.00 | 4.00 | 4.00 | 4.00 | 4.00 | 4.00 |
| Casein | 2.00 | 2.00 | 2.00 | 2.00 | 2.00 | 2.00 |
| Methy Cellulose (15 cps.) | 2.00 | 2.00 | 2.00 | 2.00 | 2.00 | 2.00 |
| Water | 28.30 | 18.30 | 18.30 | 18.00 | 33.60 | 35.70 |
| Total | 100.00 | 100.00 | 100.00 | 100.00 | 100.00 | 100.00 |

PW = Parts by weight.

All the pigment dispersions are equal in pigment content to the respective controls.

Using the above pigment dispersions, printing pastes are prepared by mixing the dispersion with an extender emulsion and a binder emulsion in suitable proportions to result in printing and fastness properties meeting acceptable standards.

For the extender emulsion, a carrier emulsion of the following composition is used:

*Table III*

| | Parts by weight |
|---|---|
| Water | 47.3 |
| Methyl cellulose (4000 cps. viscosity) | .4 |
| Ammonia | .3 |
| Ammonium lauryl sulfate (30% $H_2O$ solution) | 2.0 |
| Mineral spirits | 50.00 |
| | 100.00 |

The methyl cellulose, ammonia, and ammonium lauryl sulfate are dissolved in the water, then the mineral spirits is emulsified with suitable mixing.

As binder, the binder emulsion of the following composition is used:

*Table IV*

| | Parts by weight |
|---|---|
| Casein solution (18% casein in water) | 8.0 |
| Ammonium lauryl sulfate (30% solution in water) | 1.0 |
| Butylated melamine formaldehyde resin (BMF) (60% solution in butanol-xylol) | 6.5 |
| Mineral spirits | 6.5 |
| Acrylic co-polymer latex | 77.0 |
| Ammonia | 1.0 |
| | 100.0 |

The casein, preferably lactic acid precipitated casein, is dissolved in hot water and 1% ammonia is added. The ammonium lauryl sulfate solution is then added and the mixture is cooled to room temperature. In a separate container, the butylated melamine formaldehyde resin solution is diluted with equal weight of mineral spirits and then added to the above casein solution with constant mixing. Mixing is continued until a uniform emulsion is obtained. The pH of the acrylic co-polymer latex is adjusted to between 7.5 and 10 and the latex is then added to the resin emulsion while mixing. Mixing is continued until a uniform product is obtained.

The printing pastes are prepared by mixing the pigment dispersions, the binder and the extender (carrier) in such a manner that there is a minimum of 10% binder based on the total printing paste present. In the case of deep shades such as those containing 8–20% of pigment dispersion, the binder content is kept at a minimum of 16% of the printing paste.

Printing pastes are prepared in the above manner from the pigment dispersions of Example 7. The concentrations used are 20, 10 and 2% of pigment dispersion in the printing paste for the roller print application, while for screen print application, the printing paste contains 10, 5 and 2% of pigment dispersion. The roller prints are applied by a roller print machine with a chrome plated copper roller having seven stripes with the depth of engraving being identical in all cases. In each case, the paste containing the pigment precipitate representing this invention is printed alongside of the printing paste containing the control pigment. In screen printing, screen having six identical stripes and a rubber doctor blade is used. In order to assure uniformity of application, the pastes are printed on stripes next to each other and in screen printing all the prints are made by the same operator.

The prints are made on 80 x 80 cotton print cloth which was suitably prepared for printing by having been desized, boiled up and bleached prior to printing.

TEST RESULTS (a) Color values

Example 1.—The prints show an increase of 10% in color strength and are slightly more brilliant with the undertone drifting slightly to the yellow when compared with the control.

Example 2.—The prints show an increase of 15% in color strength and an increase in the brilliance of the color without a noticeable drift in shade.

Example 3.—The results are very close to those of Example 2.

Example 4.—The increase in color strength observed in the prints is about 10% higher than the control. No increase in brilliance is noted.

Example 5.—The prints show a 15% increase in color strength with a noticeable increase in the brilliance and a slightly greener undertone as compared to the control pigment.

Example 6.—The prints show a very slight increase in the color strength and no noticeable change in the brilliance of the print when compared with the control.

(b) Fastness properties

There is no observable change in the light fastness, wash fastness and fastness to dry cleaning of any of the prints. The controls and the pigments prepared in accordance with this invention behave alike. There is a slight, but noticeable improvement in the dry crock of the prints containing the treated pigments as compared to the controls. The improved dry crock could be attributed to the finer particle size and more complete dispersion of the treated pigments in the printing pastes.

What is claimed is:

1. In the manufacture of pigments which are stable at above 70° C. by a process involving as the last step the precipitation of the said pigments from aqueous suspensions thereof, the improvement of increasing the pigment content of the so-obtained pigment precipitates by the steps of—

(a) Adding to the pigment precipitates, obtained in the last step of pigment manufacture, a solution of a flocculant-dispersant selected from the group consisting of cold water-soluble methyl cellulose, said methyl cellulose having an average methoxylation of two methoxy groups per anhydro glucose unit, and a cold water-soluble methyl starch, said methyl starch having an average methoxylation of one methoxy group per anhydro glucose unit, said solution containing a quantity of said flocculant-dispersant to produce a slurry having from about 1 to about 4 percent flocculant-dispersant, calculated on dry pigment, therein;

(b) Heating the so-obtained pigment dispersions to a point in the range from about 70° C. to the boiling temperature where flocculation of the pigments occur; and (c) Separating the pigments from the mother liquors.

2. A method according to claim 1, wherein the separation is effected by filtering the hot pigment liquors through a preheated filter-press.

3. A method according to claim 2, wherein the filter-press is preheated to above 70° C.

4. A method according to claim 1, wherein the separation is effected by filtering the hot pigment liquors through a filter-press preheated by a member selected from the group consisting of boiling water and steam.

5. In the manufacture of pigments which are stable at about 70° C. by a process involving as the last step the precipitation of the said pigments from aqueous suspensions thereof, the improvement of increasing the pigment content of the so-obtained pigment precipitates by the steps of—

(a) Adding to the pigment presscakes, obtained in the last step of pigment manufacture, a solution of a flocculant-dispersant selected from the group consisting of cold water-soluble methyl cellulose, said methyl cellulose having an average methoxylation of two methoxy groups per anhydro glucose unit and a viscosity grade of 15 cps., and a cold water-soluble methyl starch, said methyl starch having an average methoxylation of one methoxy group per anhydro glucose unit and a viscosity grade of 15 cps., said solution containing a quantity of said flocculant-dispersant to produce a slurry having from about 1 to about 4 percent flocculant-dispersant, calculated on dry pigment, therein;

(b) Heating the so-obtained pigment dispersions to a temperature in the range from about 70° C. to the boiling temperature; and (c) Filtering the hot pigment liquors through a filter-press preheated by a member selected from the group consisting of boiling water and steam.

6. In the manufacture of pigments which are stable at about 70° C. by a process involving as the last step the precipitation of the said pigments from aqueous suspensions thereof, the improvement of increasing the pigment content of the so-obtained pigment precipitates by the steps of—

(a) Adding to the pigment presscakes, obtained in the last step of pigment manufacture, a solution of the flocculant-dispersant selected from the group consisting of cold water-soluble methyl cellulose, said methyl cellulose having an average methoxylation of two methoxy groups per anhydro glucose unit and a viscosity grade of 4000 cps., and a cold water-soluble methyl starch, said methyl starch having an average methoxylation of one methoxy group per anhydro glucose unit and a viscosity grade of 4000 cps., said solution containing a quantity of said flocculant-dispersant to produce a slurry having from about 1 to about 4 percent flocculant-dispersant, calculated on dry pigment, therein;

(b) Heating the so-obtained pigment dispersions to a temperature in the range from about 70° C. to the boiling temperature; and (c) Filtering the hot pigment liquors through a filter-press preheated by a member selected from the group consisting of boiling water and steam.

7. The method of increasing the pigment content of phthalocyanine pigment presscakes, comprising the steps of—

(a) Adding to the pigment presscakes, obtained in the last step of pigment manufacture by re-slurrying the pigment in water below 50° C. in order to obtain a pigment slurry containing from about 1% to about 10% of dry pigment, an aqueous 9% solution of cold water-soluble methyl cellulose, said methyl cellulose having an average methoxylation of two methoxy groups per anhydro glucose unit and a viscosity grade of 15 cps. in such amount as to obtain about 1% methyl cellulose based on the dry pigment content;

(b) Heating the so-obtained pigment dispersions to the boil; and (c) Filtering the hot pigment liquors through a filter-press preheated by a member selected from the group consisting of boiling water and steam.

8. The method of increasing the pigment content of azoic pigment presscakes, comprising the steps of—

(a) Adding to the pigment presscakes, obtained in the last step of pigment manufacture by re-slurrying the pigment in water below 50° C. in order to obtain a pigment slurry containing from about 1% to about 10% of dry pigment, an aqueous 9% solution of cold water-soluble methyl cellulose, said methyl cellulose having an average methoxylation of two methoxy groups per anhydro glucose unit and a viscosity grade of 15 cps. in such amount as to obtain about 1% methyl cellulose based on the dry pigment content;

(b) Heating the so-obtained pigment dispersions to the boil; and (c) Filtering the hot pigment liquors through a filter-press preheated by a member selected from the group consisting of boiling water and steam.

References Cited in the file of this patent

UNITED STATES PATENTS

| | | |
|---|---|---|
| 2,362,761 | Medl | Nov. 14, 1944 |
| 2,702,284 | Brock | Feb. 15, 1955 |

FOREIGN PATENTS

| | | |
|---|---|---|
| 934,866 | France | June 3, 1948 |

OTHER REFERENCES

The Colliery Guardian, vol. CLIII, No. 3944, July 31, 1936, pp. 191–197.

Wilkins: Transactions and Communications, Journal of The Society of Chemical Industry, November 29, 1935, pages 391T to 393T.